(12) United States Patent
Ishikawa

(10) Patent No.: US 7,346,750 B2
(45) Date of Patent: Mar. 18, 2008

(54) MEMORY INTERLEAVE SYSTEM

(75) Inventor: Hisashi Ishikawa, Yamanashi (JP)

(73) Assignee: NEC Corporation, Tokyo (JP)

( * ) Notice: Subject to any disclaimer, the term of this patent is extended or adjusted under 35 U.S.C. 154(b) by 344 days.

(21) Appl. No.: 10/938,627

(22) Filed: Sep. 13, 2004

(65) Prior Publication Data

US 2005/0060482 A1 Mar. 17, 2005

(30) Foreign Application Priority Data

Sep. 16, 2003 (JP) ............... 2003-322342

(51) Int. Cl.
*G06F 12/00* (2006.01)
*G06F 12/06* (2006.01)

(52) U.S. Cl. .......................... 711/157; 711/5

(58) Field of Classification Search ................ 711/157, 711/5
See application file for complete search history.

(56) References Cited

U.S. PATENT DOCUMENTS

| 4,550,367 | A | * | 10/1985 | Hattori et al. ................. | 711/5 |
| 5,392,443 | A | | 2/1995 | Sakakibara et al. | |
| 6,131,146 | A | * | 10/2000 | Aono .......................... | 711/157 |
| 6,453,380 | B1 | * | 9/2002 | Van Lunteren ................ | 711/5 |
| 6,912,616 | B2 | * | 6/2005 | Heap ........................... | 711/5 |

FOREIGN PATENT DOCUMENTS

| JP | 48-43839 | 6/1973 |
| JP | 58-149551 | 9/1983 |
| JP | 58-154059 | 9/1983 |
| JP | 2000-330865 | 11/2000 |
| JP | 2002-342306 | 11/2002 |
| WO | WO 95/09399 | 4/1995 |
| WO | WO 00/36513 | 6/2000 |

OTHER PUBLICATIONS

Cross-bar Switch, http://searchnetworking.techtarget.com/sDefinition/0,,sid7_gci538079,00.html, Sep. 28, 2002.*

(Continued)

*Primary Examiner*—Donald Sparks
*Assistant Examiner*—Aracelis Ruiz
(74) *Attorney, Agent, or Firm*—McGinn IP Law Group, PLLC

(57) ABSTRACT

A memory interleave system includes M ($M=2^p$, where p is a natural number) memory banks, M memory control units (MCU) corresponding respectively to the M memory banks, N (a natural number) CPUs, and N address generating units (AGU) corresponding respectively to the N CPUs. Each memory bank includes a plurality of memories. The CPUs output memory requests, each containing a first bank address (address of the memory bank) and a first intra-bank address (address of a memory in the memory bank). Each AGU receives a memory request from a corresponding CPU, and generates and outputs a second intra-bank address and a second bank address by using the first intra bank address and the first bank address. Each memory control MCU performs memory bank access control on the basis of the second intra-bank address. An MCU performing access control is selected on the basis of the second bank address.

17 Claims, 6 Drawing Sheets

OTHER PUBLICATIONS

Chipset Features Setup, http://www.adriansrojakpot.com/Speed_Demonz/BIOS_Guide/BIOS_Guide_02a.htm, Jun. 18, 2002.*

European Search Report dated Nov. 18, 2005.

Cheung K C et al, "Design and Analysis of a Gracefully Degrading Interleaved Memory System", IEEE Transactions on COmputers, IEEE Service Center, Los Alamitos, CA, US, vol. 39, No. 1, Jan. 1990, pp. 63-71, XP000099561.

"Multi -Processing System Programmable Memory Interleave Apparatus", IBM Technical Disclosure Bulletin, IBM Corp., New York, US, vol. 35, No. 6, Nov. 1, 1992, pp. 400-402, XP000314199.

* cited by examiner

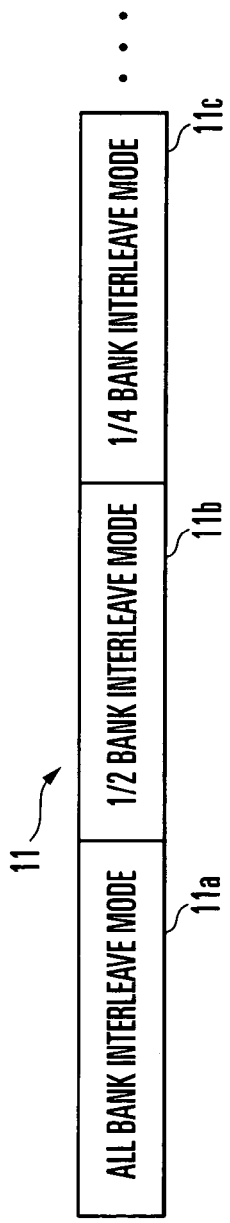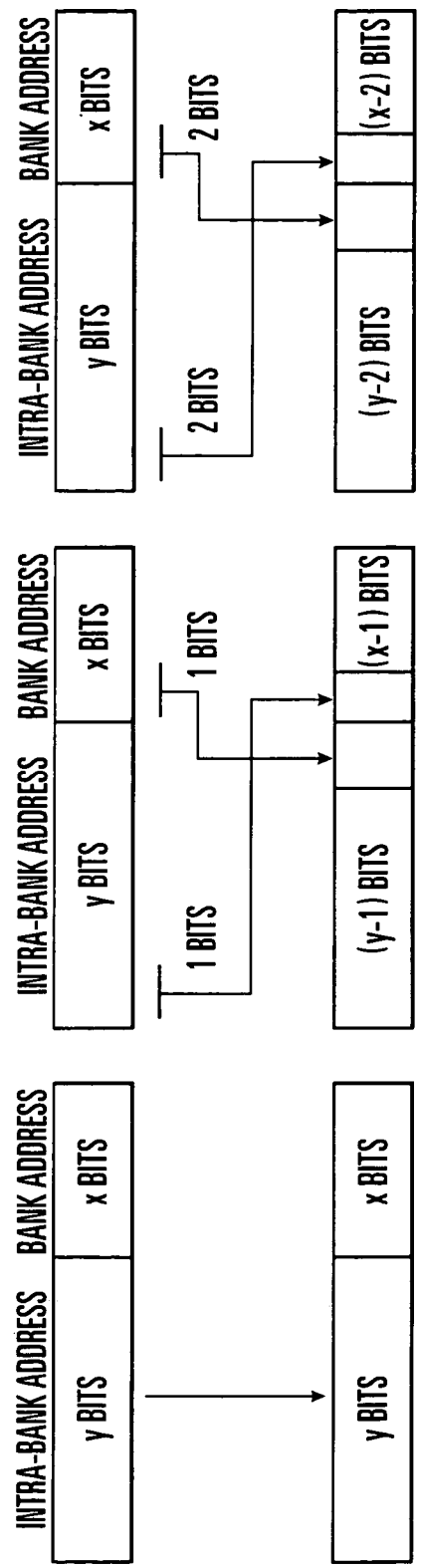

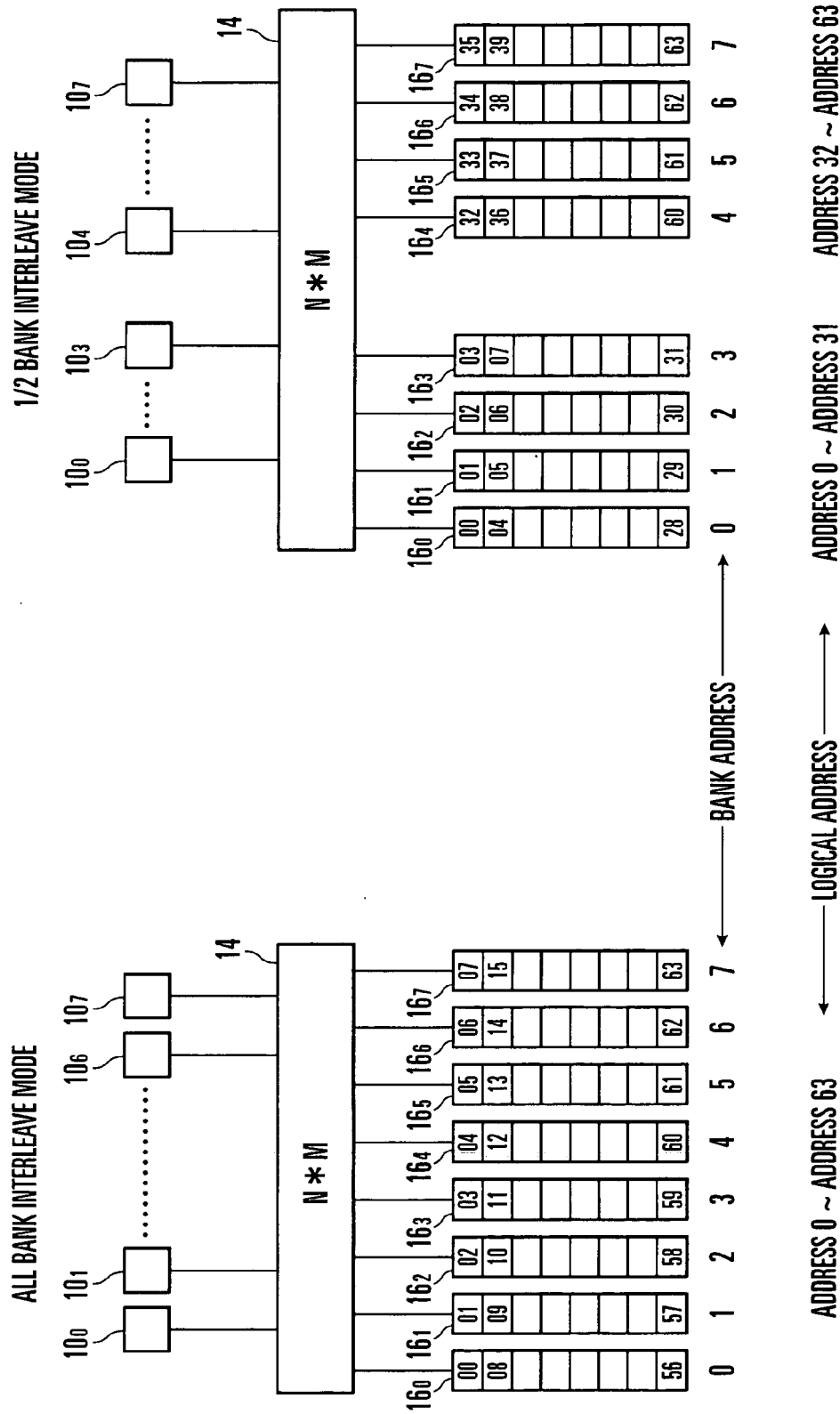

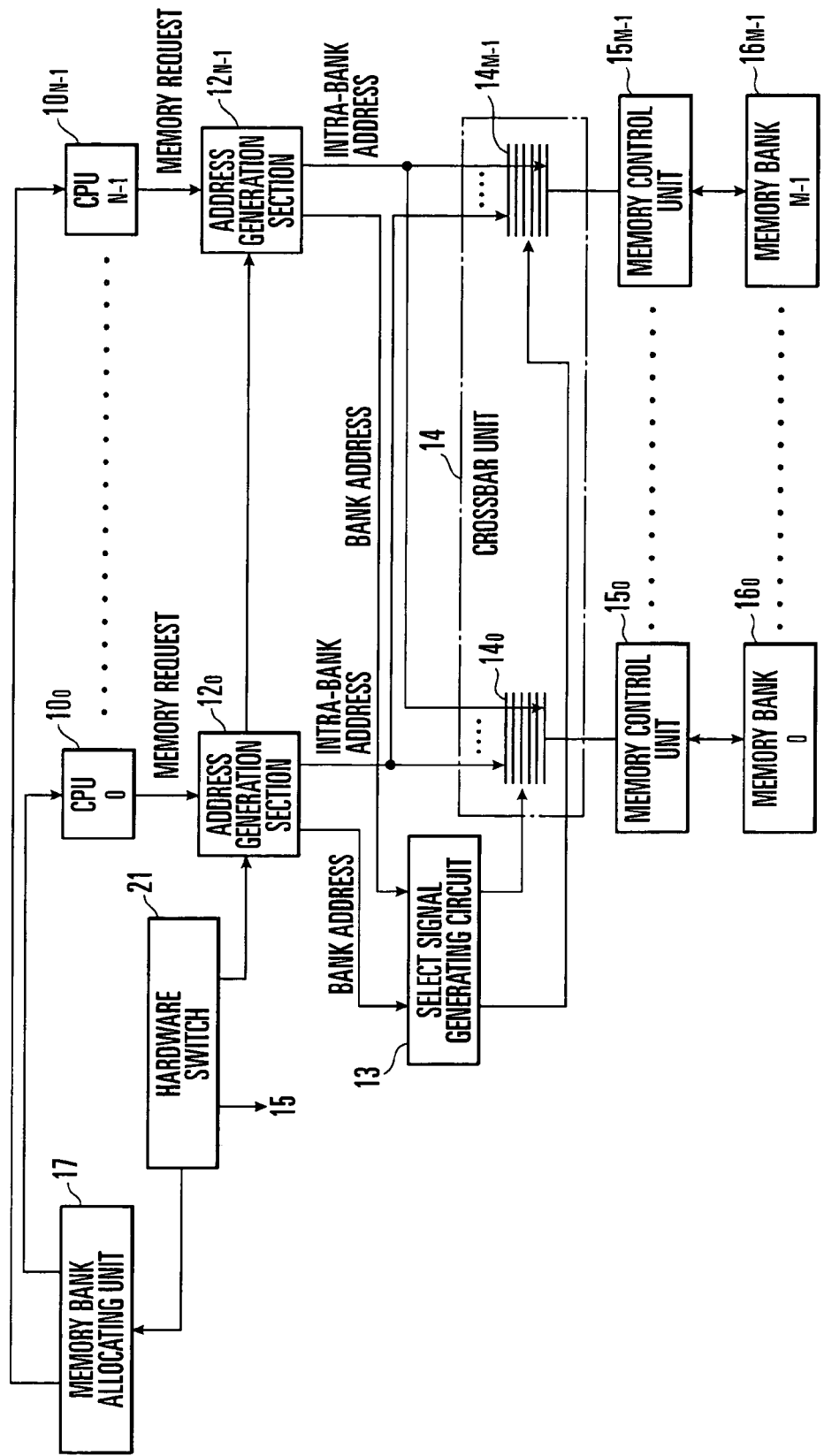
F I G. 5

MEMORY INTERLEAVE SYSTEM

BACKGROUND OF THE INVENTION

The present invention relates to a memory interleave system which realizes efficient memory access in a computer system.

FIG. 6 shows an example of the arrangement of a conventional memory interleave system.

The conventional memory interleave system shown in FIG. 6 is comprised of a vector computing unit (CPU) 101 which outputs eight vector elements V0 to V7, a leading element address, and an inter-element distance and generates a memory request for each vector element, a main storage unit 102 comprised of a plurality of memory banks 121, and a memory access control unit 103 which independently performs access control on each memory bank 121 between the vector computing unit 101 and the main storage unit 102 on the basis of a memory request.

The memory access control unit 103 further includes an adder unit 104, routing address generating unit 105, contention arbitration unit 106, and crossbar unit 107. The adder unit 104 adds the leading element address and inter-element distance sent from the vector computing unit 101 to generate the memory access address of a memory request for each vector element. The routing address generating unit 105 calculates the exclusive-OR between one bit of a routing address which is part of a memory access address and one bit other than the routing address of the memory access address for each vector element, and replaces one bit of the routing address with the resultant value, thereby generating a new routing address. The contention arbitration unit 106 performs contention arbitration between memory requests for each memory bank 121 in accordance with the new routing address. The crossbar unit 107 accesses the memory banks 121 in accordance with the contention arbitration.

In this manner, the bank interleave mode is made variable (for detailed information, see, for example, Japanese Patent Laid-Open No. 2002-342306).

The conventional memory interleave system, however, cannot improve deterioration in performance due to memory bank contention between the memory requests issued by a plurality of CPUs.

SUMMARY OF THE INVENTION

It is an object of the present invention to provide a memory interleave system which can prevent memory bank contention between memory requests by interleaving memory banks, thereby improving memory throughput.

According to the present invention, there is provided a memory interleave system comprising M (M is $2^p{}_0$ where p is a natural number) memory banks each including a plurality of memories, N (a natural number) computing means for outputting memory requests as access requests to the memory banks, the memory request containing a first bank address which is an address of the memory bank and a first intra-bank address which is an address of a memory in the memory bank, N address generating means respectively corresponding to the computing means, the address generating means receiving a memory request from the computing means, and newly generating and outputting a second intra-bank address and a second bank address by using the first intra-bank address and the first bank address which are contained in the memory request, and M memory control means respectively corresponding to the memory banks, the memory control means performing memory bank access control on the basis of the second intra-bank address output from the address generating means, and the memory control means which performs access control being selected on the basis of the second bank address output from the address generating means.

BRIEF DESCRIPTION OF THE DRAWINGS

FIG. 2A is a conceptual view showing an example of the arrangement of a software visible register, and FIGS. 2B to 2D are views for explaining the address translation logic of an address generating unit;

FIG. 3A is a view showing an example of 64-word address mapping in an all bank interleave mode, and FIG. 3B is a view showing an example of 64-word address mapping in a ½ bank interleave mode;

FIG. 5 is a block diagram showing the arrangement of a memory interleave system according to the third embodiment of the present invention.

DESCRIPTION OF THE PREFERRED EMBODIMENTS

The embodiments of the present invention will be described in detail below with reference to the accompanying drawings.

First Embodiment

Figure 1:
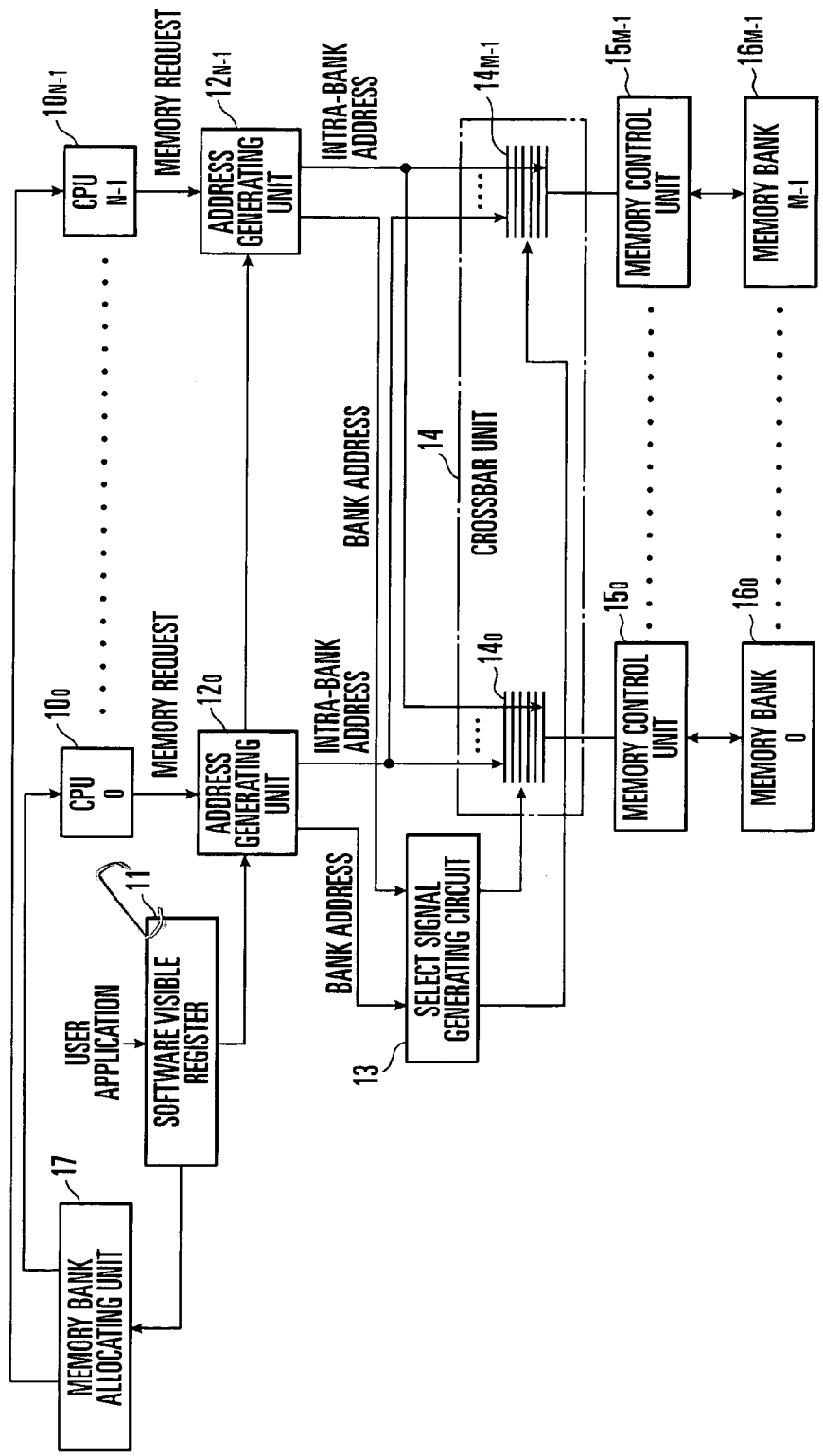
FIG. 1 is a block diagram showing the arrangement of a memory interleave system according to the first embodiment of the present invention.

FIG. 1 shows the arrangement of a memory interleave system according to the first embodiment of the present invention. The memory interleave system according to the first embodiment is comprised of N (a natural number) CPUs (computing means) $10_0$ to $10_{N-1}$, a software visible register 11, N address generating units $12_0$ to $12_{N-1}$ connected to the CPUs $10_0$ to $10_{N-1}$ in a one-to-one correspondence, a select signal generating circuit 13, a crossbar unit 14 comprised of M (M is $2^p{}_0$ where p is an integer equal to or more than two) selectors $14_0$ to $14_{M-1}$, M memory control units $15_0$ to $15_{M-1}$ connected to the selectors $14_0$ to $14_{M-1}$ in a one-to-one correspondence, M memory banks $16_0$ to $16_{M-1}$ connected to the memory control units $15_0$ to $15_{M-1}$ in a one-to-one correspondence, and a memory bank allocating unit 17. Note that "N" represents the number of connected CPUs (the number of input ports), and "M" represents the number of connected memory banks. In addition, in the first embodiment, p is an integer equal to or more than two. However, p may be one (i.e., p may be a natural number).

Each of the memory banks $16_0$ to $16_{M-1}$ is an aggregate of a plurality of memories.

The CPUs $10_0$ to $10_{N-1}$ issue memory requests which are access requests to the memory banks $16_0$ to $16_{M-1}$. Each memory request includes the first bank address which is the address of a corresponding one of the memory banks $16_0$ to $16_{M-1}$ and the first intra-bank address which is the address of a corresponding one of the memories of a corresponding one of the memory banks $16_0$ to $16_{M-1}$.

A value indicating a bank interleave mode is set in the software visible register 11, which in turn notifies the memory bank allocating unit 17 of the set value. More specifically, the software visible register 11 is comprised of flip-flops equal in number to bank interleave modes. For example, in the case shown in FIG. 2A, flip-flops 11a, 11b, and 11c respectively correspond to an all bank interleave mode, ½ bank interleave mode, and ¼ bank interleave mode. In this case, "1" is held in only a flip-flop corresponding to the mode to be used, and "0" is held in each remaining flip-flop. These values can be rewritten by a user application (not shown).

Each of the address generating units $12_0$ to $12_{N-1}$ receives a memory request from a corresponding one of the CPUs $10_0$ to $10_{N-1}$, and newly generates the second intra-bank address and second bank address by using the first intra-bank address and first bank address contained in the memory request. That is, each of the address generating units $12_0$ to $12_{N-1}$ generates the second intra-bank address and second bank address by rearranging the first intra-bank address and first bank address for at least each 0 bit. In this case, "rearranging the first intra-bank address and first bank address for each 0 bit" means that the first intra-bank address and first bank address are set as the second intra-bank address and second bank address without rearrangement.

More specifically, each of the address generating units $12_0$ to $12_{N-1}$ generates, as the second intra-bank address, a bit string comprised of the (y−q) bits of the first intra-bank address (y bits) (excluding the upper q bits (q is an integer equal to or more than 0 and equal to or less than p)) contained in the memory request received from a corresponding one of the CPUs $10_0$ to $10_{N-1}$ and the upper q bits of the first bank address (x bits) contained in the memory request, and also generates, as the second bank address, a bit string comprised of the upper q bits of the first intra-bank address and the (x−q) bits of the first bank address excluding the upper q bits.

The select signal generating circuit 13 receives the N second bank addresses output from the address generating units $12_0$ to $12_{N-1}$. When a plurality of memory requests contend, the select signal generating circuit 13 arbitrates the contention and outputs a select signal for selecting one memory bank $16_m$ (m is an integer satisfying $0 \leq m \leq M-1$) to the selector $14_m$ of the crossbar unit 14 which corresponds to the memory bank $16_m$. In other words, when a plurality of second bank addresses contend, the select signal generating circuit 13 selects one of them, and outputs a select signal to the selector $14_m$ of the crossbar unit 14 which corresponds to the memory bank $16_m$ of the selected second bank address. As a contention arbitration method, a method of determining one memory bank $16_m$ by assigning priorities to the memory banks $16_0$ to $16_{M-1}$ as access destinations is available. In addition, as methods of assigning priorities to the memory banks $16_0$ to $16_{M-1}$, a general round-robin scheme, a fixed scheme, and the like are available.

The selectors $14_0$ to $14_{M-1}$ of the crossbar unit 14 receive the N second intra-bank addresses from the address generating units $12_0$ to $12_{N-1}$ and a select signal from the select signal generating circuit 13, and outputs one intra-bank address to a corresponding one of the memory control units $15_0$ to $15_{M-1}$ in accordance with the select signal.

The memory control units $15_0$ to $15_{M-1}$ respectively perform access control on the corresponding memory banks $16_0$ to $16_{M-1}$ with the intra-bank addresses input from the selectors $14_0$ to $14_{M-1}$.

With this operation, the memory banks $16_0$ to $16_{M-1}$ are formed into memory bank groups each including $1/2^q$ the total number of memory banks in accordance with the bank interleave mode setting value in the software visible register 11, and the respective memory bank groups can be simultaneously accessed. That is, the memory banks $16_0$ to $16_{M-1}$ can be interleaved into memory bank groups each including $1/2^q$ the total number of memory banks.

The memory bank allocating unit 17 receives the bank interleave mode setting value notified from the software visible register 11, and controls the CPUs $10_0$ to $10_{N-1}$ in accordance with the setting value. More specifically, when the bank interleave mode setting value indicates the $1/2^q$ bank interleave mode, the memory banks $16_0$ to $16_{M-1}$ are interleaved into memory bank groups each including $1/2^q$ the total number of memory banks. Each of the memory bank groups is allocated to a corresponding one of the CPUs $10_0$ to $10_{N-1}$ to suppress the frequency of memory bank contention between the CPUs $10_0$ to $10_{N-1}$. In this case, the memory bank allocating unit 17 limits at least one of the first intra-bank address and the first bank address, which can be output, depending on which memory bank groups are allocated to the respective CPUs $10_0$ to $10_{N-1}$. In the first embodiment, the memory bank allocating unit 17 limits the first intra-bank address which can be output.

Note that the function of the memory bank allocating unit 17 can also be implemented by executing an operating system (OS) on the CPUs $10_0$ to $10_{N-1}$.

The operation of the memory interleave system according to the first embodiment having the above arrangement will be described next.

When each of the CPUs $10_0$ to $10_{N-1}$ issues a memory request and the bank interleave mode setting value in the software visible register 11 indicates the all bank interleave mode, a corresponding one of the address generating units $12_0$ to $12_{N-1}$ outputs the first intra-bank address (y bits) and first bank address (x bits) contained in the memory request received from each of the CPUs $10_0$ to $10_{N-1}$ as the second intra-bank address and second bank address without any change, as shown in FIG. 2B.

When the setting value in the software visible register 11 indicates the ½ bank interleave mode, each of the address generating units $12_0$ to $12_{N-1}$ outputs, as the second intra-bank address, a bit string comprised of the (y−1) bits of the first intra-bank address (excluding the most significant bit) contained in the memory request received from a corresponding one of the CPUs $10_0$ to $10_{N-1}$ and the most significant bit of the first bank address contained in the memory request, and also outputs, as the second bank address, a bit string comprised of the most significant bit of the first intra-bank address and the (x−1) bits of the first bank address excluding the most significant bit, as shown in FIG. 2C.

When the setting value in the software visible register 11 indicates the ¼ bank interleave mode, each of the address generating units $12_0$ to $12_{N-1}$ outputs, as the second intra-bank address, a bit string comprised of the (y−2) bits of the first intra-bank address (excluding the upper two bits) contained in the memory request received from a corresponding one of the CPUs $10_0$ to $10_{N-1}$ and the upper two bits of the first bank address contained in the memory request, and also outputs, as the second bank address, a bit string comprised of the upper two bits of the first intra-bank address and the (x−2) bits of the first bank address excluding the upper two bits, as shown in FIG. 2D.

The select signal generating circuit 13 outputs a select signal to the selector $14_m$ of the crossbar unit 14 which corresponds to one memory bank $16_m$ on the basis of the second bank address input from one of the address generating units $12_0$ to $12_{N-1}$. The selector $14_m$ to which the select signal is input selects one intra-bank address and outputs it to the corresponding memory control unit $15_m$. The memory control unit $15_m$ performs access control on the corresponding memory bank $16_m$ with the input intra-bank address.

The operation of the memory bank allocating unit 17 which is notified of the bank interleave mode setting value in the software visible register 11 will be described next.

When the setting value in the software visible register 11 indicates the all bank interleave mode, all the memory banks $16_0$ to $16_{M-1}$ are not interleaved but are formed into one memory bank group ($16_0$ to $16_{M-1}$). For this reason, the memory bank allocating unit 17 allocates all the memory banks $16_0$ to $16_{M-1}$ to all the CPUs $10_0$ to $10_{N-1}$ to efficiently use them.

When the setting value in the software visible register 11 indicates ½ bank interleave mode, all the memory banks $16_0$ to $16_{M-1}$ are interleaved into a ½ memory bank group ($16_0$ to $16_{M/2-1}$) and a ½ memory bank group ($16_{M/2}$ to $16_{M-1}$). For this reason, the memory bank allocating unit 17 allocates a memory bank group (memory area) to each of the CPUs $10_0$ to $10_{N-1}$. This makes it possible to suppress the frequency of memory bank contention between the CPU group which accesses the memory bank group ($16_0$ to $16_{M/2-1}$) and the CPU group which accesses the memory bank group ($16_{M/2}$ to $16_{M-1}$). For example, the memory bank allocating unit 17 forms the N CPUs $10_0$ to $10_{N-1}$ into two or less groups (group a and group b), and allocates the memory areas of the memory bank group ($16_0$ to $16_{M/2-1}$) to group a, and the memory areas of the memory bank group ($16_{M/2}$ to $16_{M-1}$) to group b, thereby suppressing memory bank contention between group a and group b.

When the setting value in the software visible register 11 indicates ¼ bank interleave mode, all the memory banks $16_0$ to $16_{M-1}$ are interleaved into a ¼ memory bank group ($16_0$ to $16_{M/4-1}$), a ¼ memory bank group ($16_{M/4}$ to $16_{M/2-1}$), a ¼ memory bank group ($16_{M/2}$ to $16_{3M/4-1}$), and a ¼ memory bank group ($16_{3M/4}$ to $16_{M-1}$). For this reason, the memory bank allocating unit 17 allocates a memory bank group (memory area) to each of the CPUs $10_0$ to $10_{N-1}$. This makes it possible to suppress the frequency of memory bank contention between the CPU group which accesses the memory bank group ($16_0$ to $16_{M/4-1}$), the CPU group which accesses the memory bank group ($16_{M/4}$ to $16_{M/2-1}$), the CPU group which accesses the memory bank group ($16_{M/2}$ to $16_{3M/4-1}$), and the CPU group which accesses the memory bank group ($16_{3M/4}$ to $16_{M-1}$). For example, the memory bank allocating unit 17 forms the N CPUs $10_0$ to $10_{N-1}$ into four or less groups (group a, group b, group c, and group d), and allocates memory areas 0 to L/4 of the memory bank group ($16_0$ to $16_{M/4-1}$) to group a, memory areas L/4 to L/2 of the memory bank group ($16_{M/4}$ to $16_{M/2-1}$) to group b, memory areas L/2 to Lx3/4 of the memory bank group ($16_{M/2}$ to $16_{3M/4-1}$) to group c, and memory areas Lx3/4 to L of the memory bank group ($16_{3M/4}$ to $16_{M-1}$) to group d, thereby suppressing memory bank contention between the respective CPU groups.

As is obvious, although not described in detailed here, when the bank interleave modes are further extended into a ⅛ bank interleave mode, 1/16 bank interleave mode, and the like, and the memory banks $16_0$ to $16_{M-1}$ are interleaved into memory groups each including $1/2^q$ the total number of memory banks, the memory bank allocating unit 17 forms the CPUs $10_0$ to $10_{N-1}$ into $2^q$ or less groups in accordance with a memory interleave count $2^q$ of a bank interleave mode, and allocates a memory bank group (memory areas) including $1/2^q$ the total number of memory banks to each CPU group, thereby suppressing memory bank contention between the respective CPU groups.

How the select signal generating circuit 13 generates a select signal will be described next by exemplifying a case wherein N=8 and M=8. In this case, each intra-bank address is comprised of three bits, and each bank address is comprised of three bits.

FIGS. 3A and 3B explain examples of 64-word address mapping.

Operation in the case of the all bank interleave mode will be described first.

The select signal generating circuit 13 receives the second bank addresses generated by the address generating units $12_0$ to $12_7$ corresponding to the CPUs $10_0$ to $10_7$, arbitrates memory access contention, and outputs a select signal to the selector $14_m$ corresponding to a second bank address m.

The selector $14_m$ to which the select signal is input selects the second intra-bank address to be output on the basis of the three bits of the select signal for selecting eight inputs.

According to the selection logic of the selector $14_m$, when the three bits of the select signal are "000", the selector $14_m$ outputs the second intra-bank address from the address generating unit $12_0$ corresponding to the CPU $10_0$. Likewise, when the three bits are "001", the selector $14_m$ outputs the second intra-bank address from the address generating unit $12_1$ corresponding to the CPU $10_1$. When the three bits are "010", the selector $14_m$ outputs the second intra-bank address from the address generating unit $12_2$ corresponding to the CPU $10_2$. When the three bits are "011", the selector $14_m$ outputs the second intra-bank address from the address generating unit $12_3$ corresponding to the CPU $10_3$. When the three bits are "100", the selector $14_m$ outputs the second intra-bank address from the address generating unit $12_4$ corresponding to the CPU $10_4$. When the three bits are "101", the selector $14_m$ outputs the second intra-bank address from the address generating unit $12_5$ corresponding to the CPU $10_5$. When the three bits are "110", the selector $14_m$ outputs the second intra-bank address from the address generating unit $12_6$ corresponding to the CPU $10_6$. When the three bits are "111", the selector $14_m$ outputs the second intra-bank address from the address generating unit $12_7$ corresponding to the CPU $10_7$.

In this mode, as shown in FIG. 3A, the memory area is not divided.

Operation to be performed when the interleave mode is changed to the ½ interleave mode will be described next.

When the address generating units $12_0$ to $12_{N-1}$ perform address translation shown in FIG. 2C, the addresses output from the CPUs $10_0$ to $10_{N-1}$ are translated into addresses like those shown in Table 1. The select signal generating circuit 13 receives the second bank addresses from the address generating units $12_0$ to $12_{N-1}$ and outputs a select signal to the selector $14_m$. With this operation, the first half memory banks obtained by dividing the memory area into two areas are interleaved into the memory groups $16_0$ to $16_3$, and the second half memory banks are interleaved into the memory bank groups $16_4$ to $16_7$. As a consequence, the memory area is divided as shown in FIG. 3B.

Operation to be performed when the interleave mode is changed to the ¼ interleave mode will be described next.

When the address generating units $12_0$ to $12_{N-1}$ perform address translation shown in FIG. 2D, the addresses output from the CPUs $10_0$ to $10_{N-1}$ are translated into addresses like those shown in Table 1. The select signal generating circuit 13 receives the second bank addresses from the address generating units $12_0$ to $12_{N-1}$ and outputs a select signal to the selector $14_m$. With this operation, the memory area is divided into four areas with addresses 0 to 15 (each address indicating a logical word address), addresses 16 to 31, addresses 32 to 47, and addresses 48 to 63, and can be interleaved into memory banks $16_0$ and $16_1$, memory banks $16_2$ and $16_3$, memory banks $16_4$ and $16_5$, and memory banks $16_6$ and $16_7$.

In the ⅛ bank interleave mode, 1/16 bank interleave mode, ..., $1/2^p$ interleave mode as well, the memory area is divided by performing similar address translation, and the memory banks $16_0$ to $16_7$ can be interleaved.

TABLE 1

| Logical Address | All Bank Interleave | | | ½ Bank Interleave | | | ¼ Bank Interleave | | |
|---|---|---|---|---|---|---|---|---|---|
| | Intra-bank AD | Bank AD | Physical AD | Intra-bank AD | Bank AD | Physical AD | Intra-bank AD | Bank AD | Physical AD |
| 0 | 000 | 000 | 0 | 000 | 000 | 0 | 000 | 000 | 0 |
| 1 | 000 | 001 | 1 | 000 | 001 | 1 | 000 | 001 | 1 |
| 2 | 000 | 010 | 2 | 000 | 010 | 2 | 001 | 000 | 8 |
| 3 | 000 | 011 | 3 | 000 | 011 | 3 | 001 | 001 | 9 |
| 4 | 000 | 100 | 4 | 001 | 000 | 8 | 010 | 000 | 16 |
| 5 | 000 | 101 | 5 | 001 | 001 | 9 | 010 | 001 | 17 |
| 6 | 000 | 110 | 6 | 001 | 010 | 10 | 011 | 000 | 24 |
| 7 | 000 | 111 | 7 | 001 | 011 | 11 | 011 | 001 | 25 |
| 8 | 001 | 000 | 8 | 010 | 000 | 16 | 100 | 000 | 32 |
| 9 | 001 | 001 | 9 | 010 | 001 | 17 | 100 | 001 | 33 |
| 10 | 001 | 010 | 10 | 010 | 010 | 18 | 101 | 000 | 40 |
| 11 | 001 | 011 | 11 | 010 | 011 | 19 | 101 | 001 | 41 |
| 12 | 001 | 100 | 12 | 011 | 000 | 24 | 110 | 000 | 48 |
| 13 | 001 | 101 | 13 | 011 | 001 | 25 | 110 | 001 | 49 |
| 14 | 001 | 110 | 14 | 011 | 010 | 26 | 111 | 000 | 56 |
| 15 | 001 | 111 | 15 | 011 | 011 | 27 | 111 | 001 | 57 |
| 16 | 010 | 000 | 16 | 100 | 000 | 32 | 000 | 010 | 2 |
| 17 | 010 | 001 | 17 | 100 | 001 | 33 | 000 | 011 | 3 |
| 18 | 010 | 010 | 18 | 100 | 010 | 34 | 001 | 010 | 10 |
| 19 | 010 | 011 | 19 | 100 | 011 | 35 | 001 | 011 | 11 |
| 20 | 010 | 100 | 20 | 101 | 000 | 40 | 010 | 010 | 18 |
| 21 | 010 | 101 | 21 | 101 | 001 | 41 | 010 | 011 | 19 |
| 22 | 010 | 110 | 22 | 101 | 010 | 42 | 011 | 010 | 26 |
| 23 | 010 | 111 | 23 | 101 | 011 | 43 | 011 | 011 | 27 |
| 24 | 011 | 000 | 24 | 110 | 000 | 48 | 100 | 010 | 34 |
| 25 | 011 | 001 | 25 | 110 | 001 | 49 | 100 | 011 | 35 |
| 26 | 011 | 010 | 26 | 110 | 010 | 50 | 101 | 010 | 42 |
| 27 | 011 | 011 | 27 | 110 | 011 | 51 | 101 | 011 | 43 |
| 28 | 011 | 100 | 28 | 111 | 000 | 56 | 110 | 010 | 50 |
| 29 | 011 | 101 | 29 | 111 | 001 | 57 | 110 | 011 | 51 |
| 30 | 011 | 110 | 30 | 111 | 010 | 58 | 111 | 010 | 58 |
| 31 | 011 | 111 | 31 | 111 | 011 | 59 | 111 | 011 | 59 |
| 32 | 100 | 000 | 32 | 000 | 100 | 4 | 000 | 100 | 4 |
| 33 | 100 | 001 | 33 | 000 | 101 | 5 | 000 | 101 | 5 |
| 34 | 100 | 010 | 34 | 000 | 110 | 6 | 001 | 100 | 12 |
| 35 | 100 | 011 | 35 | 000 | 111 | 7 | 001 | 101 | 13 |
| 36 | 100 | 100 | 36 | 001 | 100 | 12 | 010 | 100 | 20 |
| 37 | 100 | 101 | 37 | 001 | 101 | 13 | 010 | 101 | 21 |
| 38 | 100 | 110 | 38 | 001 | 110 | 14 | 011 | 100 | 28 |
| 39 | 100 | 111 | 39 | 001 | 111 | 15 | 011 | 101 | 29 |
| 40 | 101 | 000 | 40 | 010 | 100 | 20 | 100 | 100 | 36 |
| 41 | 101 | 001 | 41 | 010 | 101 | 21 | 100 | 101 | 37 |
| 42 | 101 | 010 | 42 | 010 | 110 | 22 | 101 | 100 | 44 |
| 43 | 101 | 011 | 43 | 010 | 111 | 23 | 101 | 101 | 45 |
| 44 | 101 | 100 | 44 | 011 | 100 | 28 | 110 | 100 | 52 |
| 45 | 101 | 101 | 45 | 011 | 101 | 29 | 110 | 101 | 53 |
| 46 | 101 | 110 | 46 | 011 | 110 | 30 | 111 | 100 | 60 |
| 47 | 101 | 111 | 47 | 011 | 111 | 31 | 111 | 101 | 61 |
| 48 | 110 | 000 | 48 | 100 | 100 | 36 | 000 | 110 | 6 |
| 49 | 110 | 001 | 49 | 100 | 101 | 37 | 000 | 111 | 7 |
| 50 | 110 | 010 | 50 | 100 | 110 | 38 | 001 | 110 | 14 |
| 51 | 110 | 011 | 51 | 100 | 111 | 39 | 001 | 111 | 15 |
| 52 | 110 | 100 | 52 | 101 | 100 | 44 | 010 | 110 | 22 |
| 53 | 110 | 101 | 53 | 101 | 101 | 45 | 010 | 111 | 23 |
| 54 | 110 | 110 | 54 | 101 | 110 | 46 | 011 | 110 | 30 |
| 55 | 110 | 111 | 55 | 101 | 111 | 47 | 011 | 111 | 31 |
| 56 | 111 | 000 | 56 | 110 | 100 | 52 | 100 | 110 | 38 |
| 57 | 111 | 001 | 57 | 110 | 101 | 53 | 100 | 111 | 39 |
| 58 | 111 | 010 | 58 | 110 | 110 | 54 | 101 | 110 | 46 |
| 59 | 111 | 011 | 59 | 110 | 111 | 55 | 101 | 111 | 47 |
| 60 | 111 | 100 | 60 | 111 | 100 | 60 | 110 | 110 | 54 |
| 61 | 111 | 101 | 61 | 111 | 101 | 61 | 110 | 111 | 55 |
| 62 | 111 | 110 | 62 | 111 | 110 | 62 | 111 | 110 | 62 |
| 63 | 111 | 111 | 63 | 111 | 111 | 63 | 111 | 111 | 63 |

Second Embodiment

Figure 4:
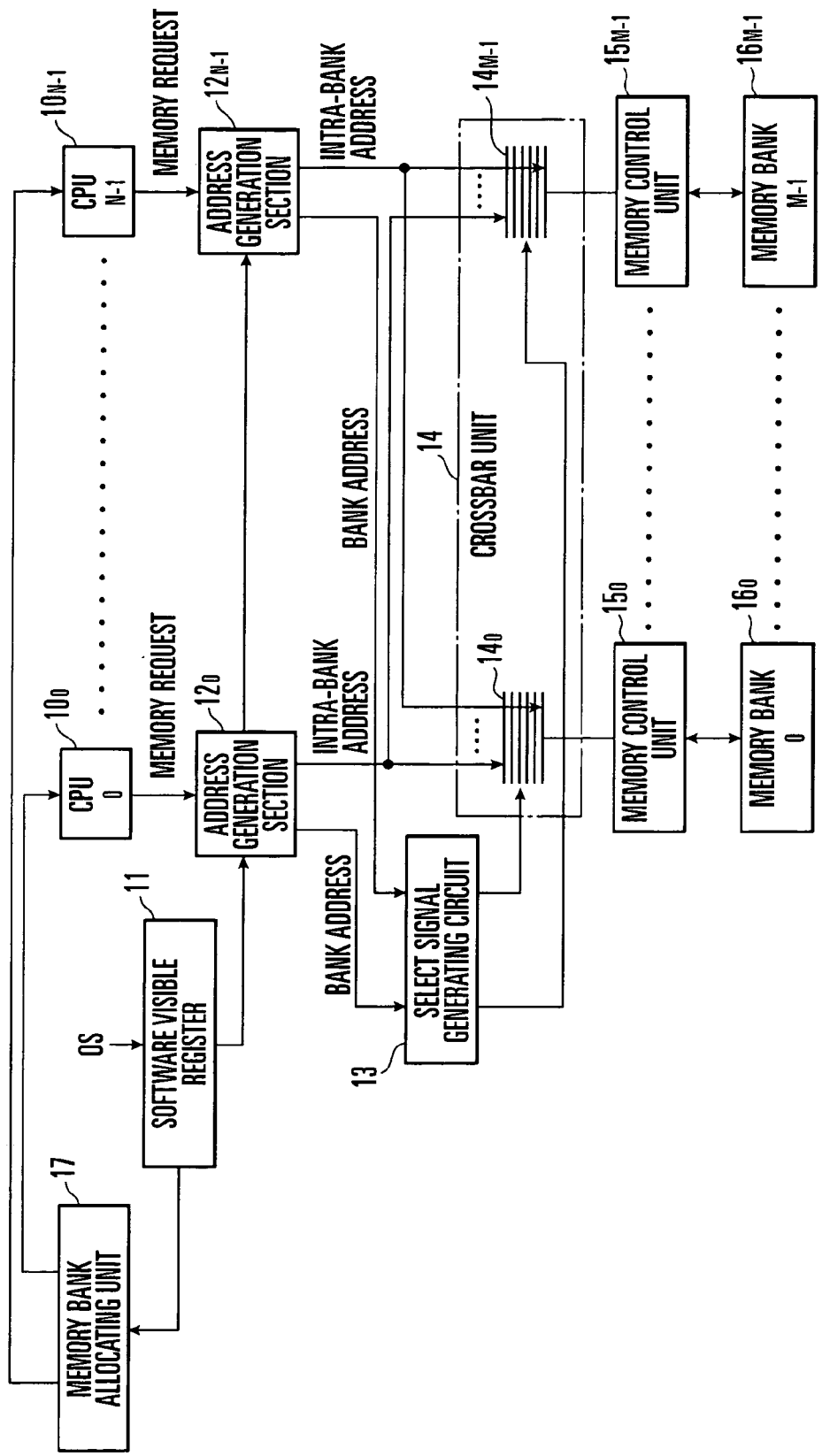
FIG. 4 is a block diagram showing the arrangement of a memory interleave system according to the second embodiment of the present invention.
Figure 6:
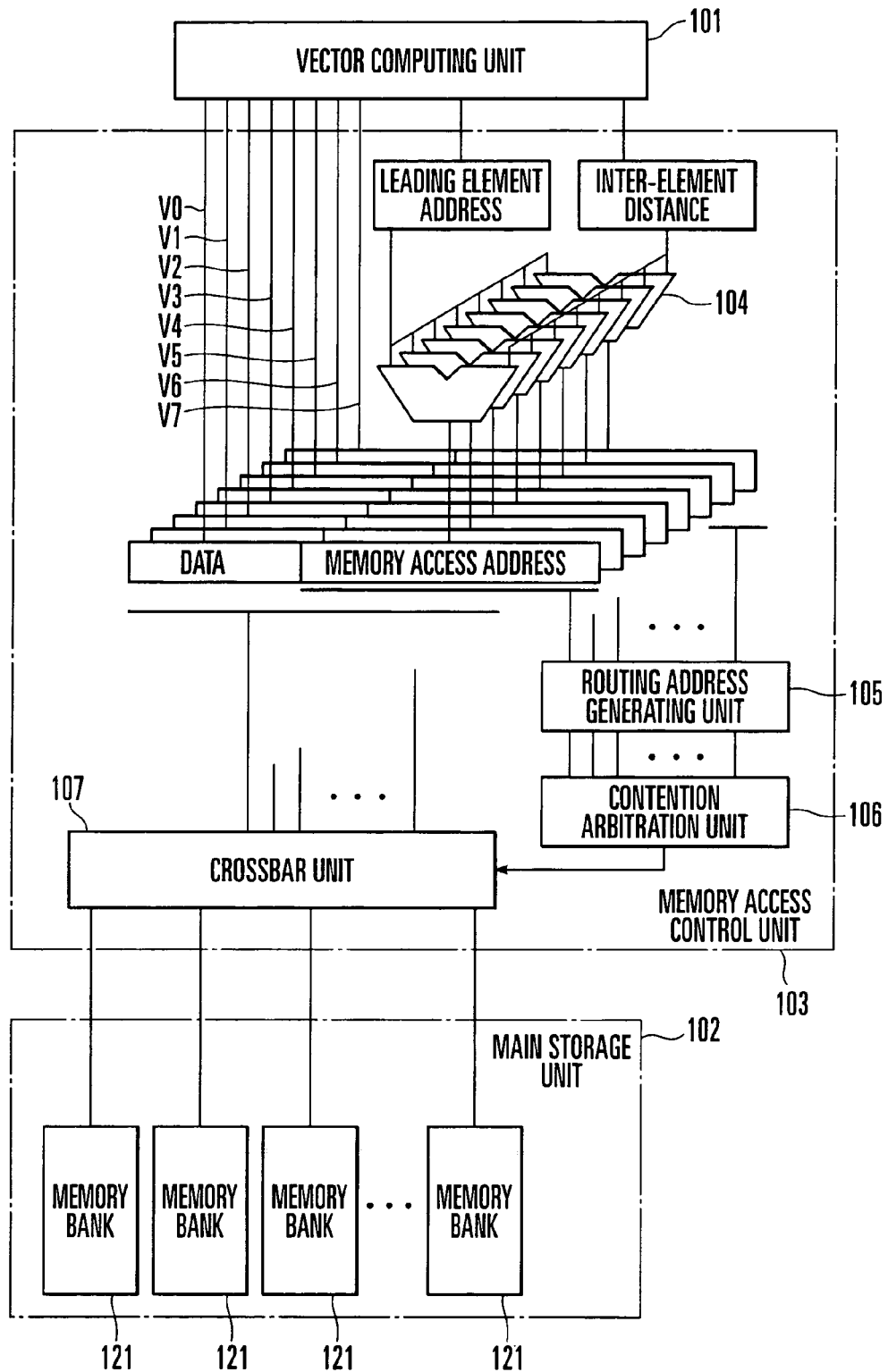
FIG. 6 is a circuit block diagram showing an example of the arrangement of a conventional memory interleave system.

FIG. 4 shows the arrangement of a memory interleave system according to the second embodiment of the present invention. In the memory interleave system according to the first embodiment shown in FIG. 1, a user application sets a value indicating a bank interleave mode in the software visible register 11. That is, the user application determines a bank interleave mode. In contrast to this, in the memory interleave system according to the second embodiment, a memory bank allocating unit 17 sets a value in a software visible register 11.

Note that since other portions of which no mention is particularly made are configured in the same manner as corresponding portions in the interleave system according to the first embodiment, they are denoted by the same reference numerals, and a detailed description thereof will be omitted.

In the memory interleave system according to the second embodiment having the above arrangement, when assigning jobs to be executed to CPUs $10_0$ to $10_{N-1}$, the memory bank allocating unit 17 itself determines a bank interleave mode by referring to the memory areas used by the CPUs $10_0$ to $10_{N-1}$ and the number of parallel operations by the CPUs $10_0$ to $10_{N-1}$, and writes the corresponding value in the software visible register 11. This makes it possible to improve the utilization efficiency of the memories and the performance of the system.

In the second embodiment as well, the function of the memory bank allocating unit 17 described above can be implemented by executing an operating system (OS) on the CPUs $10_0$ to $10_{N-1}$.

Note that a detailed description of other operations is similar to that in the memory interleave system according to the first embodiment, and hence will be omitted.

Third Embodiment

FIG. 5 shows the arrangement of a memory interleave system according to the third embodiment of the present invention. In the memory interleave systems according to the first and second embodiments shown in FIGS. 1 and 4, a bank interleave mode is determined by setting a value indicating a bank interleave mode in the software visible register 11. In contrast to this, in the memory interleave system according to the third embodiment, a user determines a bank interleave mode by manually setting a value indicating a bank interleave mode with a hardware switch 21 such as a dip switch.

Note that since other portions of which no mention is particularly made are configured in the same manner as corresponding portions in the interleave system according to the first embodiment, they are denoted by the same reference numerals, and a detailed description thereof will be omitted.

In the memory interleave system according to the third embodiment having the above arrangement, the k-pole (k is a natural number) hardware switch 21 is prepared on a substrate, and a bank interleave mode is identified by the value set by the k-pole switch.

Assume that the quadrupole hardware switch 21 is used. In this case, for example, when the value set by the hardware switch 21 is "0000", the all bank interleave mode is set. When the set value is "0001", the ½ bank interleave mode is set. When the set value is "0010", the ¼ bank interleave mode is set. When the set value is "0011", the ⅛ bank interleave mode is set.

Note that Note that a detailed description of other operations is similar to that in the memory interleave system according to the first embodiment, and hence will be omitted.

As has been described above, according to the above embodiments, memory areas can be allocated to CPU groups, and memory bank contention between memory requests issued by the CPU groups can be reduced, and the utilization efficiency of the memories and the performance of the system can be improved.

What is claimed is:

1. A memory interleave system comprising:
   M (M is $2^p$ where p is a natural number) memory banks each including a plurality of memories;
   N (a natural number) computing means for outputting memory requests as access requests to said M memory banks, each of said memory requests containing a first bank address which comprises an address of said memory bank and a first intra bank address which comprises an address of a memory in said memory bank;
   N address generating means respectively corresponding to said N computing means;
   and M memory control means respectively corresponding to said M memory banks,
   wherein said N address generating means receive a memory request from said corresponding computing means, and newly generates and outputs a second intra bank address and a second bank address by using said first intra bank address and said first bank address which are contained in said memory request,
   wherein said M memory control means perform memory bank access control on a basis of said second intra bank address output from said N address generating means, and each of said M memory control means performing such access control being selected on a basis of said second bank address output from said address generating means,
   wherein said N address generating means generate said second intra bank address and said second bank address in accordance with a bank interleave mode setting value,
   wherein said N address generating means generate said second intra bank address and said second bank address by rearranging said first intra bank address and said first bank address for at least 0 bit in accordance with said bank interleave mode setting value, and
   wherein when said bank interleave mode setting value indicates a $½^q$ bank interleave mode (q comprises an integer of not less than 0 and not more than p) and said first bank address and said first intra bank address respectively include x bits and y bits (x and y comprise integers of not less than q), said address generating means sets, as said second intra bank address, a bit string comprised of (y−q) bits of the first intra bank address excluding upper q bits and upper q bits of the first bank address, and also sets, as said second bank address, a bit string comprised of an upper q bits of said first intra bank address and (x−q) bits of said first bank address excluding said upper q bits.

2. A system according to claim 1, wherein said address generating means sets said first intra bank address and said first bank address as said second intra bank address and said second bank address, respectively, without any change when said bank interleave mode setting value indicates an all bank interleave mode, sets, as said second intra bank address, a bit string comprised of (y−1) bits of said first intra bank address excluding a most significant bit and a most significant bit of said first bank address, and also sets, as said second bank address, a bit string comprised of a most significant bit of said first intra bank address and (x−1) bits of said first bank address excluding a most significant bit when the bank interleave mode setting value indicates a ½ bank interleave mode, and sets, as said second intra bank address, a bit string comprised of upper two bits of said first bank address and (y−2) bits of said first intra bank address excluding upper two bits, and also sets, as said second bank address, a bit string comprised of two upper bits of said first intra bank address and (x−2) bits of said first bank address excluding an upper two bits when said bank interleave mode setting value indicates a ¼ bank interleave mode.

3. A system according to claim 1, further comprising
M selectors respectively corresponding to said M memory control means, said selectors receiving N second intra bank addresses from said N address generating means and a select signal, and outputting an intra bank address to a memory control means selected from said M memory control means in accordance with the select signal, and
select signal generating means for receiving N second bank addresses from said N address generating means, selecting one of a plurality of second bank addresses when said plurality of second bank addresses contend, and outputting said select signal to said selector corresponding to said memory bank of said selected second bank address.

4. A system according to claim 3, wherein said M selectors constitute crossbar means.

5. A system according to claim 1, further comprising a software visible register in which a bank interleave mode setting value is set in a software manner and which outputs said setting value to said address generating means.

6. A system according to claim 5, wherein said software visible register allows a user application to variably set a bank interleave mode setting value.

7. A system according to claim 5, further comprising memory bank allocating means for receiving said bank interleave mode setting value output from said software visible register and controlling said N computing means in accordance with said setting value.

8. A system according to claim 7, wherein when said bank interleave mode setting value indicates a $1/2^q$ bank interleave mode (q comprises an integer of not less than 0 and not more than p), said memory bank allocating means forms said M memory banks into $2^q$ memory bank groups, and allocates one of said memory bank groups to each of said N computing means.

9. A system according to claim 8, wherein said memory bank allocating means limits at least one of said first intra bank address and said first bank address which can be output to said N computing means depending on which memory bank group is allocated to said N computing means.

10. A system according to claim 7, wherein said software visible register allows said memory bank allocating means to variably set said bank interleave mode setting value.

11. A system according to claim 1, further comprising a hardware switch which allows said bank interleave mode setting value to be manually set and outputs said setting value to said N address generating means.

12. A system according to claim 11, further comprising memory bank allocating means for receiving said bank interleave mode setting value output from said hardware switch and controlling said N computing means in accordance with said setting value.

13. A system according to claim 12, wherein, when said bank interleave mode setting value indicates a $1/2^q$ bank interleave mode (q comprises an integer of not less than 0 and not more than p), said memory bank allocating means forms said M memory banks into $2^q$ memory bank groups, and allocates one of said memory bank groups to each of said N computing means.

14. A system according to claim 13, wherein said memory bank allocating means limits at least one of said first intra bank address and said first bank address which can be output to said N computing means depending on which memory bank group is allocated to said N computing means.

15. A system according to claim 1, wherein N comprises an integer of not less than two.

16. A system according to claim 1, wherein said N computing means comprises a CPU (Central Processing Unit).

17. A system according to claim 1, wherein said bank interleave mode setting value is selected from an all bank interleave mode, a ½ bank interleave mode, and a ¼ bank interleave mode.

* * * * *